United States Patent [19]
Miyo

[11] Patent Number: 5,257,029
[45] Date of Patent: Oct. 26, 1993

[54] TRANSMISSION POWER CONTROL METHOD AND APPARATUS IN SATELLITE COMMUNICATION

[75] Inventor: Tokihiro Miyo, Kawasaki, Japan

[73] Assignee: Fujitsu Limited, Kanagawa, Japan

[21] Appl. No.: 900,352

[22] Filed: Jun. 18, 1992

[30] Foreign Application Priority Data

Jun. 21, 1991 [JP] Japan .................................. 3-150219

[51] Int. Cl.[5] .......................................... H04B 7/185
[52] U.S. Cl. ................................... 342/352; 455/67.3; 455/67.4; 455/69
[58] Field of Search ............... 455/9, 13.4, 67.3, 67.4, 455/69, 10, 12.1; 342/352

[56] References Cited

U.S. PATENT DOCUMENTS 4,038,600 7/1977 Thomas .
4,637,017 1/1987 Assal et al. ........................ 370/104.1

FOREIGN PATENT DOCUMENTS 3-139027 6/1991 Japan .

Primary Examiner—Theodore M. Blum
Attorney, Agent, or Firm—Armstrong, Westerman, Hattori, McLeland & Naughton

[57] ABSTRACT

Signals including two signals having levels different from each other are transmitted to the satellite, and the phase difference between the return signals of the two signals is measured. Transmission power control is performed so that the phase difference becomes equal to the difference measured in clear weather conditions.

14 Claims, 3 Drawing Sheets

A : OUTPUT POWER
B : PHASE

TRANSMISSION POWER CONTROL METHOD AND APPARATUS IN SATELLITE COMMUNICATION

BACKGROUND OF THE INVENTION

1. Field of the Invention

The present invention relates to a method and apparatus for controlling the transmission power of a transmitter at an optimum level. More particularly, the present invention is concerned with a method and apparatus for controlling the transmission power of a transmitter of an earth station communicating through a communication satellite with another earth station in a satellite communication system so that the input power of a transponder mounted on the communication satellite attains an optimum level in spite of a variation in the attenuation ratio caused by rainfall, etc.

2. Description of the Related Art

In a satellite communication system, a radio wave transmitted from an earth station through an up link is relayed in a transponder mounted on a communication satellite, and is received through a down link in another earth station. Input power of the transponder is limited because power usable within the satellite is limited. In addition, if the input power level is too small, the power level in the down link becomes small and the received power level in the latter earth station attains a level below the system margin. Therefore, the input power of the transponder must be within an optimum range to maintain stable satellite communication.

An attenuation ratio in the up link and the down link is not constant but varies because of rainfall etc. The variation in the attenuation ratio is small in a lower frequency band such as C band (up link: 6 GHz; down link: 4 GHz) and is large in a higher frequency band such as Ku band (up link: 14 GHz; down link: 12 GHz) and Ka band (up link: 30 GHz; down link: 20 GHz. Therefore, if the Ku or Ka band is utilized, compensation for the rainfall attenuation in the up link, i.e. up link compensation is necessary for maintaining the input power of the transponder within the optimum range.

The up link compensation that has already been proposed is attained by increasing the transmission power of the former earth station in accordance with an evaluated increase of the attenuation factor, i.e., an evaluated rainfall attenuation factor in the up link.

The evaluation of the up link rainfall attenuation factor is performed by measuring received levels of a signal returned from the satellite and received levels of a beacon signal in rainy weather conditions and in clear weather conditions. The beacon signal is usually transmitted from the satellite at a frequency at the edge of a frequency band of the down link or in a different polarized wave from that of the main signals.

The rainfall attenuation factor in the up link and the down link in the returned signal are represented as $L_{ur}$ and $L_{dr}$ [dB], respectively, and the rainfall attenuation factor in the down link in the beacon signal is represented as $L_{db}$. A summation of the rainfall attenuation factors $L_{ur}+L_{dr}$ is determined by measuring levels of received return signals in clear weather conditions and in rainy weather conditions and by calculating the difference between the two levels. The rainfall attenuation factor $L_{db}$ is determined by measuring levels of received beacon signals in clear weather conditions and in rainy weather conditions and by calculating the difference between the two levels. Assuming $L_{dr} \approx L_{db}$, the up link rainfall attenuation factor $L_{ur}$ is calculated from the following formula.

$$L_{ur}=(L_{ur}+L_{dr})-L_{dr} \approx (L_{ur}+L_{dr})-L_{db}$$

The transmission power of the earth station is controlled so as to compensate the up link attenuation factor $L_{ur}$, to thereby maintain the input power of the transponder at an optimum level. In the case that the satellite does not transmit the beacon signal, a telemetry signal for watching the satellite can be used for estimating the up link attenuation factor $L_{ur}$.

One of the most important problem in transmission power control of the earth station is control accuracy. The aforementioned conventional methods do not provide sufficient control accuracy because of the following factors:

i) a variation in transmission power of a beacon transmitter mounted on the satellite,
ii) a variation in a level detector for the beacon signal,
iii) a variation in a level detector for the return signal,
iv) a gain difference between a beacon receiver and a receiver for receiving the return signal,
v) a gain variation in the transponder, and
vi) small signal suppressing effect in the transponder.

A summation of the above deterioration factors amounts to, for example, 4 dB. Since the degree of deterioration in the control accuracy is comparable to the extent of the transmission power control, satellite communication is often more stable unless the transmission power control is carried out.

In addition, if the beacon signal is carried on a different polarized wave from that of the main signal, exclusive receiver equipment including a polarized wave branching circuit, a low noise amplifier, and a frequency converter is required, and therefore the equipment is large in construction compared to that for the main signal.

In order to improve said shortcomings, the Applicant has proposed a transmission power control method utilizing non-linearity in input output characteristics of the transponder, which is disclosed in Japanese Unexamined Patent Publication (Kokai) No. 3-139027. In this method, the set point of the input power of the transponder is set to a value near the saturation level. Transmission signals having two different levels are transmitted to the satellite and transmission power is controlled so that a level difference in received return signals becomes equal to a predetermined value. When the input power of the transponder decreases because of rainfall attenuation; the level difference in the received return signals becomes large because the input power of the transponder falls below the saturation level. Thus, stabilization of the input power of the transponder is attained by controlling the transmission power so that the level difference in the return signals becomes equal to a value measured in clear weather conditions.

However, in the aforementioned method, since the set point of the input power of the transponder is set to a value near the saturation level, a problem exists in that large intermodulation distortion occurs. Furthermore, since a momentary power larger than a steady-state power is transmitted, it is difficult to realize said method because of legal restrictions.

SUMMARY OF THE INVENTION

It is an object of the present invention to provide a method and apparatus for realizing accurate and stable control of transmission power.

In accordance with the present invention there is provided a method of controlling the transmission power of a transmitter for communicating through a satellite in order to stabilize a received power of the satellite comprising the steps of:

generating a first signal and a second signal having a level different than the level of the first signal;

transmitting the first and the second signals from the transmitter to the satellite;

receiving return signals of the first and the second signals from the satellite;

measuring a phase difference between the return signals of the first and the second signals; and controlling the transmission power so that the phase difference becomes equal to a predetermined value.

In accordance with the present invention there is also provided an apparatus for controlling the transmission power of a transmitter for communicating through a satellite in order to stabilize a receive power of the satellite, comprising:

means for generating a first signal and a second signal having a level different than the level of the first signal;

means for transmitting the first and the second signals to the satellite;

means for receiving return signals of the first and the second signals from the satellite;

means for measuring a phase difference between the return signals of the first and the second signals; and means for controlling the transmission power so that the phase difference becomes equal to a predetermined value.,

BRIEF DESCRIPTIONS OF THE DRAWINGS

DESCRIPTION OF THE PREFERRED EMBODIMENTS

Figure 1:
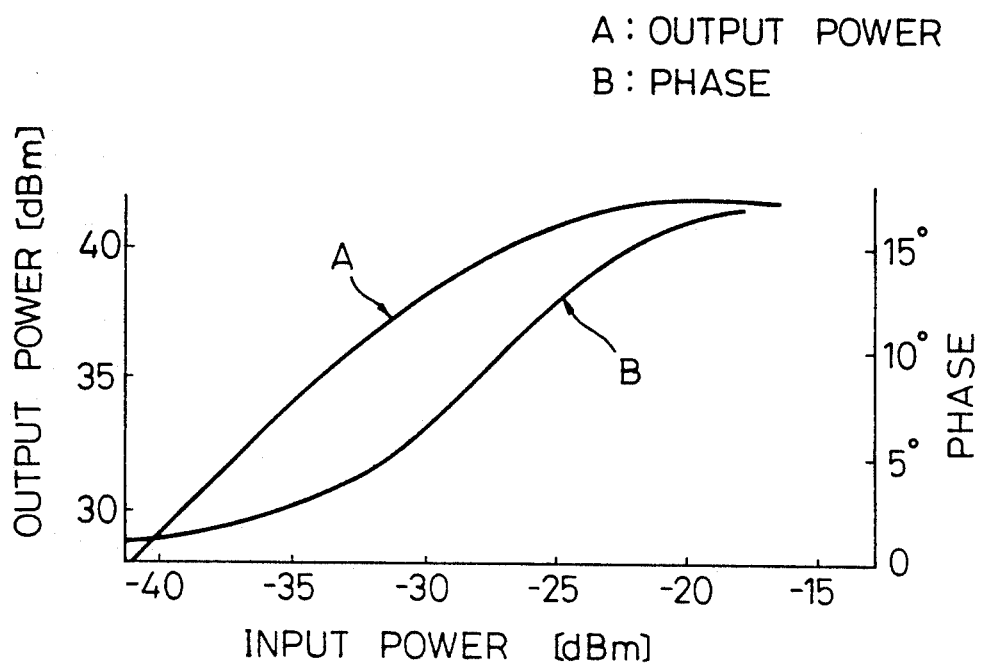
FIG. 1 is a graph showing input output characteristics of a power amplifier using a travelling wave tube.

FIG. 1 is a graph showing input output characteristics of a power amplifier using a travelling wave tube that is usually used in a transponder mounted on a communication satellite. The curve A represents characteristics of an output power in relation to an input power and the carve B represents characteristics of a phase of an output signal in relation to the input power. The curve A shows characteristics wherein the output power increases and the increase of the output power is gradually saturated as the input power increases. On the other hand, the curve B shows characteristics wherein the phase of the output signal gradually increases as the input power increases and the increase of the phase continues even in the range where the curve A is saturated.

Figure 2:
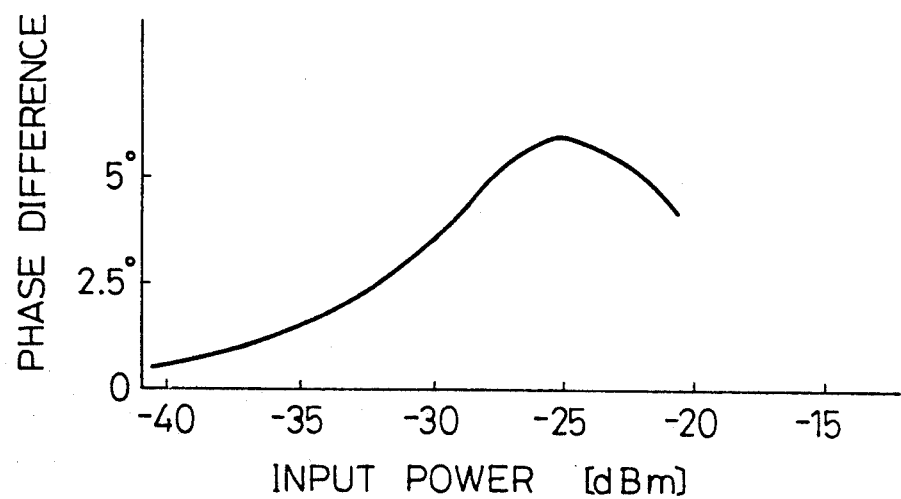
FIG. 2 is a graph showing characteristics of a phase difference of output signals when two signals having different levels are input to the power amplifier.

FIG. 2 is a graph showing characteristics of a phase difference between output signals when two signals having a level difference of 5 dB are input to the power amplifier. Referring to FIG. 2, it is realized that, if a set value of the input power is below −25 dBm, a variation in the input power can be detected from a variation in the phase difference between two output signals. For example, in the case where the set input power is −30 dBm, the input power is surely −30 dBm if the observed phase difference is about 3.7°. When the input power becomes −32 dBm because of rainfall, the observed phase difference becomes 2.5°. Thus, by controlling the transmission power so that the phase difference becomes 3.7°, the input power of the transponder is controlled to the set value of −30 dBm.

Figure 3:
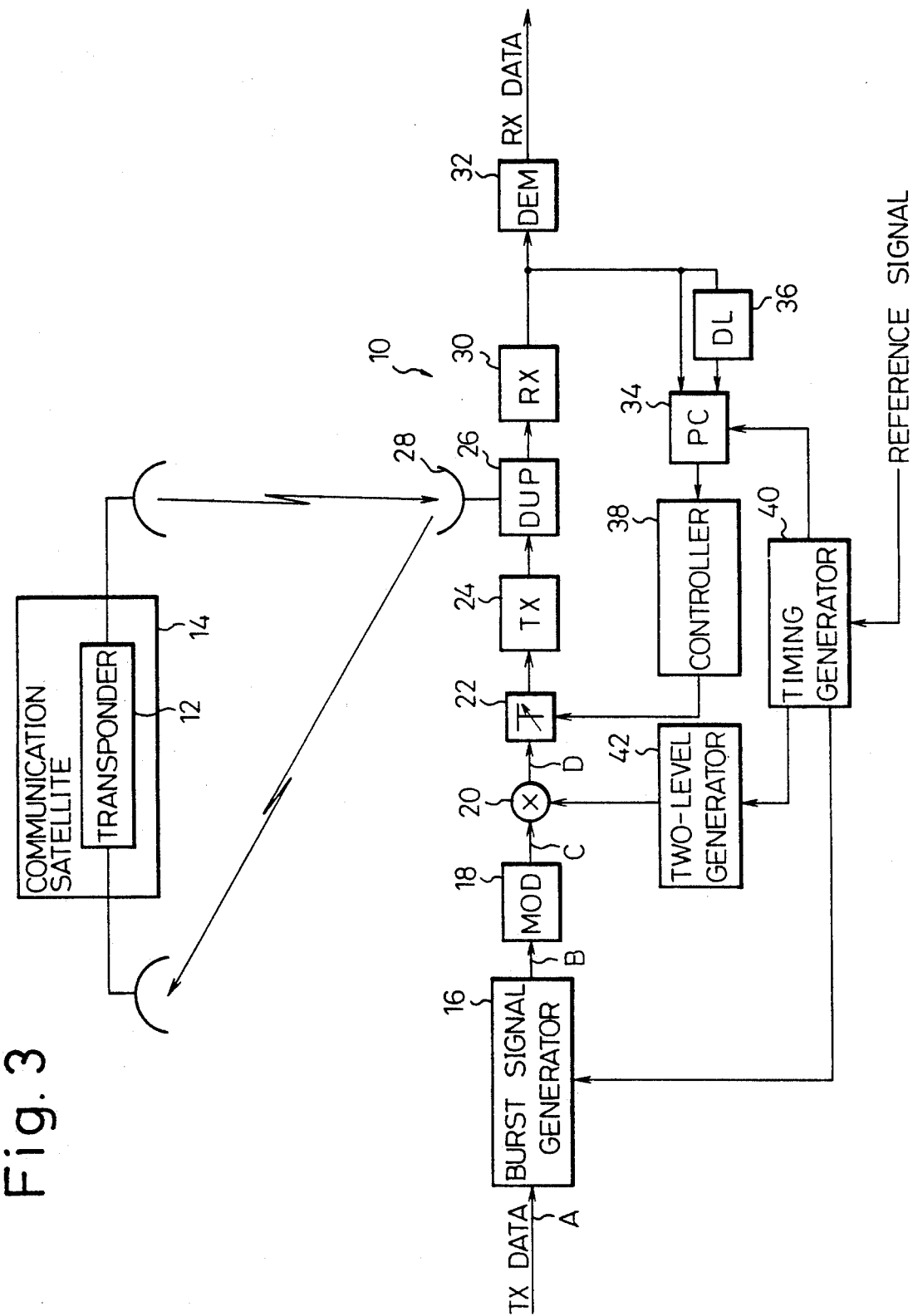
FIG. 3 is a block diagram showing the construction of an earth station according to an embodiment of the present invention.

FIG. 3 is a block diagram showing the construction of an earth station according to an embodiment of the present invention. In the earth station 10 of FIG. 3, transmission power is controlled according to the above principle so that input power of a transponder 12 mounted on a communication satellite 14 attains an optimum level.

In FIG. 3, a burst signal generator 16 constructs burst signals from continuous digital data by compressing the continuous digital data and by appending preambles to the compressed data. The burst signal generated in the burst signal generator 16 is modulated in a modulator 18, according to a predetermined modulation method such as QPSK (Quadri-Phase Shift Keying). The modulation signal is input through a multiplier 20 and a variable attenuator 22 to a transmitter 24. A radio frequency signal output from the transmitter 24 is transmitted through a duplexer 26 and antenna 28 to the communication satellite 14. A return signal received in the antenna 28 is input through the duplexer 26 to a receiver 30. An output signal of the receiver 30 in a intermediate frequency is demodulated in a demodulator 32. The output signal of the receiver 30 is also fed to one input of a phase comparator 34, and the output signal delayed in a delay unit 36 is fed to the other input of the phase comparator 34. The phase comparator 34 compares a phase of the received return signal with the delayed return signal and outputs a signal corresponding to a phase difference between the two signals during periods according to a timing signal. A controller 38 controls the variable attenuator 22 so that the phase difference output from the phase comparator 34 becomes equal to a predetermined value. The predetermined value may be a value measured in clear weather conditions. A timing generator 40 generates timing signals for the burst signal generator 16, the phase comparator 34 and a two-level generator 42 based on a reference signal. The two-level generator 42 generates a two-level signal that is fed to another input of the multiplier 20.

A burst signal in TDMA (Time Division Multiple Access) includes a carrier recovery sequence (CR), a bit timing recovery sequence (BTR) and a data sequence (DATA). Since the CR part does not contain modulation components, the CR part is sufficient to use for detection of the phase difference. Thus, the two levels of the transmission signal are given to the CR part in the multiplier 20 of FIG. 3. Delay time of the delay unit 36 is set to a time difference between two sections provided with different levels, and the phase comparator 34 outputs the phase difference during periods corresponding to these sections.

Figure 4A:
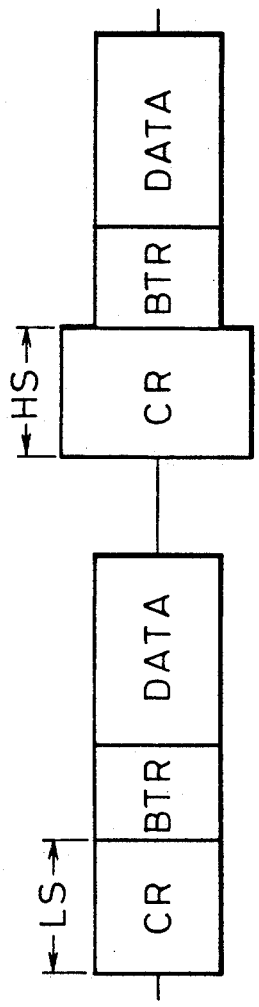
FIGS. 4A to 4C are diagrams showing several examples of transmission signals according to the present invention.
Figure 4B:
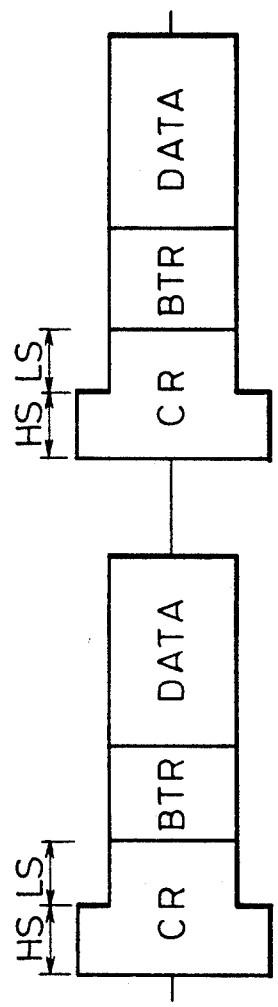
Figure 4C:
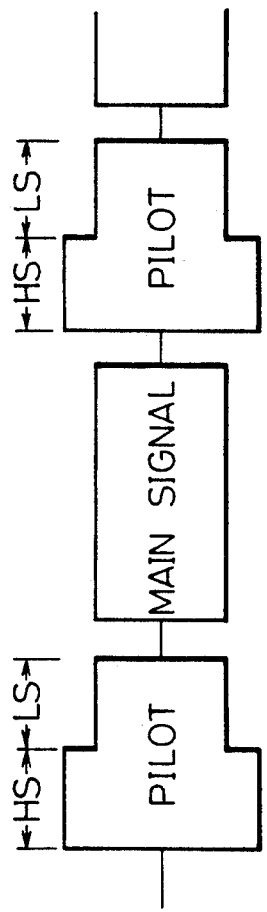

FIGS. 4A to 4C show three examples of the transmission signal according to the present invention. In the example of FIG. 4A, a burst signal including a CR part having a low level, i.e., a low level signal (LS) and a burst signal including a CR part having a high level, i.e., a high level signal (HS) are alternately transmitted. The delay time of the delay unit 36 (FIG. 3) is set to a time difference between adjacent burst signals. The phase comparator 34 outputs the phase difference while the CR part is fed to the phase camparator 34.

In the example of FIG. 4B, a high level is provided to the first half of the CR part and a low level is provided to the second half of the CR part. In the example of FIG. 4C, pilot signals are inserted into guard time periods between main signals, and a high level and low level are provided to the first and second half of the pilot signals, respectively.

The present invention is not limited to the aforementioned embodiment, and various modifications are possible. For example, the transmission power control is performed not only by controlling the variable attenuator but also by directly controlling the transmission power amplifier. In addition, the generation of the two levels and the detection of the phase difference in the return signal are possible in any timing other than the carrier recovery sequence CR and the pilot signal as long as the main signal is not affected.

I claim:

1. A method of controlling the transmission power of a transmitter for communicating through a satellite in order to stabilize a received power of the satellite, comprising the steps of:
    generating a first signal having a first power level and a second signal having a second power level different than said first power level of said first signal;
    transmitting said first signal and said second signal from said transmitter to said satellite;
    receiving return signals of said first signal and said second signal from said satellite;
    measuring a phase difference between said return signals of said first signal and said second signal from said satellite; and
    controlling said transmission power so that said phase difference becomes equal to a predetermined value.

2. A method as claimed in claim 1, wherein the first signal is transmitted in a period different from a period when the second signal is transmitted in the transmitting step, and the measuring step comprises the substeps of:
    delaying received return signals for delay time corresponding to a time difference between the first and the second signals; and
    comparing received return signals with the delayed signals.

3. A method as claimed in claim 2, wherein the transmitter transmits burst signals each including a carrier recovery sequence, and the transmitter alternately transmits a burst signal including a carrier recovery sequence having a first level as the first signal and a burst signal including a carrier recovery sequence having a second level different from the first level as the second signal.

4. A method as claimed in claim 2, wherein the transmitter transmits burst signals each including a carrier recovery sequence, first half of which has a first level as the first signal and second half of which has a second level different from the first level as the second signal.

5. A method as claimed in claim 2, wherein the transmitter transmits burst signals and pilot signals between the burst signals, and the pilot signals include the first and the second signals.

6. An apparatus for controlling the transmission power of a transmitter for communicating through a satellite in order to stabilize a received power of the satellite, comprising:
    means for generating a first signal having a first power level and a second signal having a second power level different than said first power level of said first signal;
    means for transmitting said first signal and said second signal from said transmitter to said satellite;
    means for receiving return signals of said first signal and said second signal from said satellite;
    means for measuring a phase difference between said return signals of said first signal and said second signal; and
    means for controlling said transmission power so that said phase difference becomes equal to a predetermined value.

7. An apparatus as claimed in claim 6, wherein the first signal is transmitted in a period different from a period when the second signal is transmitted by the transmitting means, and the measuring means comprises:
    means for delaying received return signals for delay time corresponding to a time difference between the first and the second signals; and
    means for comparing received return signals with the delayed signals.

8. An apparatus as claimed in claim 7, wherein the transmitting means transmits burst signals each including a carrier recovery sequence, and the transmitting means alternately transmits a burst signal including a carrier recovery sequence having a first level as the first signal and a burst signal including a carrier recovery sequence having a second level different from the first level as the second signal.

9. An apparatus as claimed in claim 7, wherein the transmitting means transmits burst signals each including a carrier recovery sequence, first half of which has a first level as the first signal and second half of which has a second level different from the first level as the second signal.

10. An apparatus as claimed in claim 7, wherein the transmitting means transmits burst signals and pilot signals between the burst signals, and the pilot signals include the first and the second signals.

11. A method of controlling transmission power of a transmitter for communicating through a satellite in order to stabilize a received power of the satellite, comprising the steps of:
    generating a first signal having a first power level and a second signal having a second power level different than said first power level of said first signal;
    providing a variable attenuator for controlling a power level of said first and second signals prior to transmission to said satellite;
    transmitting said first signal and said second signal from said transmitter to said satellite;
    receiving return signals of said first and said second signals from said satellite;
    measuring a phase difference between the return signals of said first and said second signals from said satellite; and
    using said phase difference for controlling said variable attenuator to vary power of signals transmitted to the satellite, so that said phase difference becomes equal to a predetermined value.

12. A method as claimed in claim 11, further comprising providing a delay means for delaying said second signal; and between the steps of receiving the return signals of said first and said second signals from said satellite and measuring the phase difference between the return signals of said first and said second signals, using said delay means for delaying said second signal.

13. An apparatus for controlling the transmission power of a transmitter for communicating through a satellite in order to stabilize a received power of the satellite, comprising:

signal generator means for generating a first signal having a first power level and a second signal having a second power level different than said first power level of said first signal, said signal generator means including a controller and a variable attenuator receiving an output signal from said controller for controlling a power level of said first and second signals prior to transmission to said satellite;

means for transmitting said first signal and said second signal from said transmitter to said satellite;

receiver means for receiving return signals of said first signal and said second signal from said satellite; and phase difference means for measuring a phase difference between said return signals of said first signal and said second signal, said phase difference means supplying an output signal;

wherein said phase difference means supplies an output signal to said controller, for controlling said transmission power in response to said phase difference, so that said phase difference becomes equal to a predetermined value.

14. An apparatus as claimed in claim 13, further comprising a delay means connected between said receiver means and said phase difference means, for delaying said second signal.

* * * * *